March 1, 1966  J. A. PETTAVEL ETAL  3,237,519
GONIOMETRIC MICROSCOPE WITH ADJUSTABLE LIGHT SOURCE, PRISM
AND SENSOR UNITS FOR PROFILE GAUGING
Filed Dec. 27, 1961  2 Sheets-Sheet 1

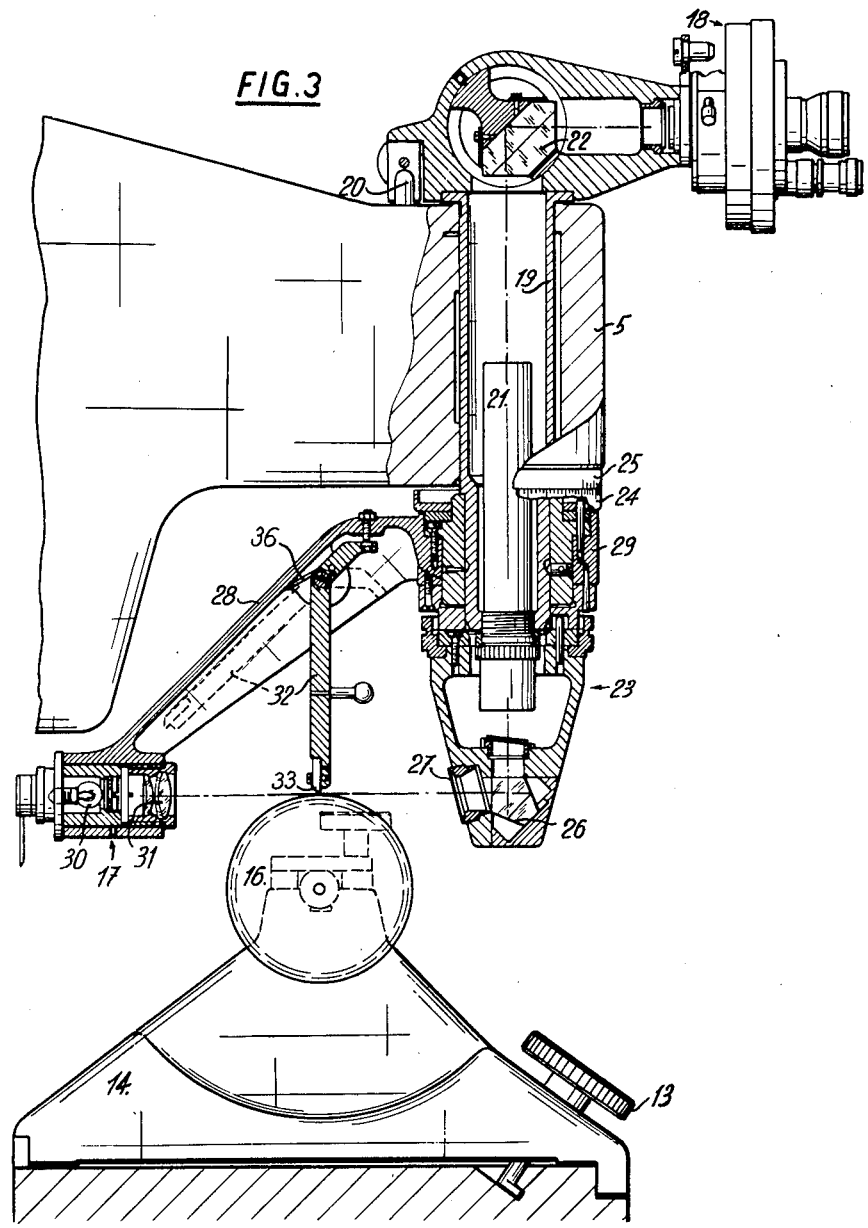

United States Patent Office 3,237,519
Patented Mar. 1, 1966

3,237,519
GONIOMETRIC MICROSCOPE WITH ADJUSTABLE LIGHT SOURCE, PRISM AND SENSOR UNITS FOR PROFILE GAUGING
Jacques A. Pettavel and Andre H. Mottu, both of Geneva, Switzerland, assignors to Societe Genevoise d'Instruments de Physique, Geneva, Switzerland, a Swiss company
Filed Dec. 27, 1961, Ser. No. 162,327
Claims priority, application Switzerland, Dec. 30, 1960, 14,605/60
2 Claims. (Cl. 88—39)

Various kinds of apparatus for measuring or for controlling the profile of objects, more particularly the profile of screw-threads, are known. In some of these apparatus, a screw-thread, for instance, is observed by means of a microscope; the screw-thread, generally mounted between points, is illuminated from below by means of a light beam directed on to the object lens system of the microscope which is located above the thread. In order to ensure that the image of the screw-thread will be clear, the light beam must be tangential to the flank of the thread; consequently, the light beam must be inclined at an angle which depends on the pitch of the thread and is greater when the pitch is greater. In the machines known at the present time it is impossible, for reasons of design, to incline the beam at an angle of more than 10° to one side or the other of the vertical, and this fact prevents observation of screws which have a relatively great pitch and, in general, of articles having edges inclined at a very large angle.

The present invention aims to provide a microscope which does not have this disadvantage. This microscope is characterised in that it comprises a rotatably adjustable optical element which receives the beam from the source and sends the beam into the principal axis of the microscope, that the light source is pivotally movable about the principal axis of the microscope in such a manner as to permit orientation of the light beam according to the profile to be observed, and lastly that means are provided which associate the angular position of the optical element with that of the source in such a manner that the light source remains constantly directed towards the optical element.

Figure 1:
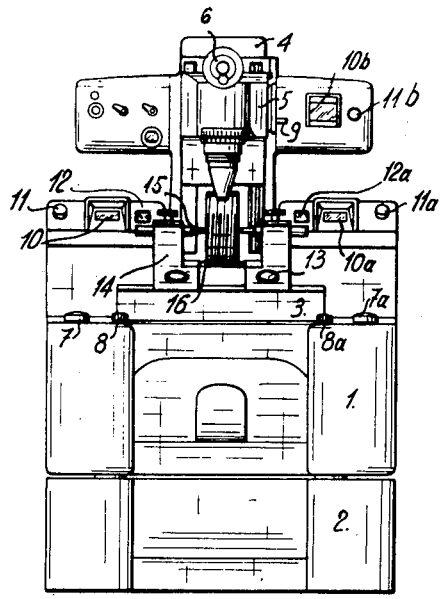
Figure 2:
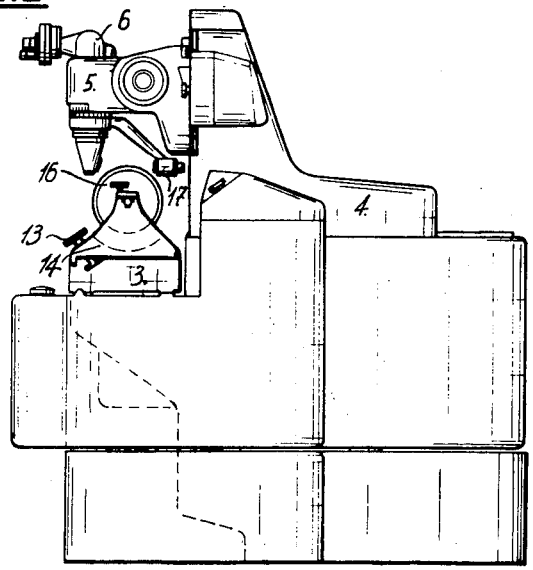

An embodiment of the invention chosen by way of example is illustrated in the accompanying drawings, in which:

FIGURE 1 is a general front view of a measuring apparatus,
FIGURE 2 is a side view, and
FIGURE 3 is a detailed view of the microscope, on a larger scale.

The drawings illustrate a measuring machine of which the frame 1 is mounted at three points on a base 2. The front part of this frame carries a longitudinally slidable table 3, and its central part carries a transversely displaceable slide 4. The slide carries a vertically slidable holder 5 on which a goniometric microscope 6 is removably mounted. The table and the slide are driven by motors; the rapid displacement of the table and slide is controlled by means of buttons 8 and 8a respectively, whereas their slow displacement is controlled by means of buttons 7 and 7a respectively. A handwheel 9 is provided for displacing the holder. The table, the slide and the holder are each provided with a scale which is graduated in millimetres and of which the graduations are projected, by means of suitable optical devices, on to screens 10, 10a and 10b in front of which are displaceable indicators controlled by buttons 11, 11a and 11b and permitting accurate location of the scale markings. The whole range of numbers of millimeters on the scale is given by rotary drums, not shown in the drawings, of which the scales appear through small windows 12 and 12a.

The table carries two supports 14 which are fixed by locking members 13. A screw 16, of which the thread profile is to be observed, is mountable between the points 15 of these supports. A light source 17 is mounted rigid with the microscope and illuminates the thread tangentially in the direction of the thread.

The microscope comprises a head 18 in which are mounted an eyepiece and the reticules necessary for measuring or checking the profiles that are observed. There may be for instance two superimposed reticules of which one is movable to measure the angle of the flank of a thread, or alternatively, reticules provided with standard profiles adapted to be superimposed on and compared with the profiles to be checked.

This head is mounted on a cylindrical tube 19 which engages, with a sliding fit, in a guide in the holder 5. The angular position of the head relative to the holder 5 is set by means of a finger 20. The object lens system 21 of the microscope is fixed inside tube 19 and the observation device 23 is mounted for rotation about the bottom of the tube. The angular position of this device is defined by means of a graduated drum 24 cooperating with a reference scale marked on a ring 25 rigid with the holder 5. The end of this observation device is provided with a light deviating prism 26 which is protected by the glasses of two windows and sends the light beam, which is emitted by the source 17, towards the object lens system 21. An arm 28 is secured, by means of a ring 29, to the bottom of the tube 19, and this arm carries at its end the light source 30 which comprises two lenses 31 forming a converging system and directing the light beam towards the prism. A rod 32 is provided and has an extremity terminating in a position-finding edge or sensor 33 located in a plane parallel to the axis of the points 15. This rod is capable of being selectively retracted, as shown in broken lines, against a spring 36.

In order to observe the profile of a thread it is necessary to project into the microscope as clear an image of the section of this thread as possible. In order to do this, it is necessary to adjust the axis of the light beam so that this axis is tangential to the thread being observed and normal to the section being observed. For this purpose, the observation head is rotated through an angle corresponding to that of the pitch of the thread, and the table, the slide and the holder are then displaced. The rotation of the observation head is accompanied by rotation of the image in the field of vision. The direction of the axis of the points 15, which is at the origin of the angular measurements, is thereby lost. The position-finding sensor or edge 33 permits the direction of the axis of the points 15 to be found again. The arm 35 is retracted when adjustment has been completed.

The light source is mounted movably with respect to the prism 26 disposed in the observation head of the microscope, and it is possible to rotate this source through any angle whatsoever, that is to say, to observe screws of which the pitch may be relatively large, or edges which are very greatly inclined. The light beam can of course be inclined only on condition that the source remains associated with the head of the microscope.

We claim:
1. Apparatus for gauging profiles of objects having a given axis and profile portions inclined and pitched relative to said given axis, means for holding said object in position with said axis extending in a given direction, a microscope having in operation a principal longitudinal axis displaced vertically and horizontally relative to the given axis of said object, said microscope comprising an eyepiece for viewing and gauging the profile of a given one of said profile portions being observed therethrough, means including a lens system in said microscope transmitting an image of the profile of said object being viewed in said eyepiece and mounted rotatable about said microscope principal axis from a given reference position, said lens system having an optical axis parallel to said microscope principal axis, a source of a beam of light, means mounting said source of light spaced from said microscope jointly rotatable with said lens system about said microscope principal axis in fixed relative position with said lens system and mounting said light source for constantly transmitting said beam of light into said lens system, a light deviating prism, means mounting said light deviating prism for rotation about said microscope principal axis relative to said given reference position and unrestricted by said lens system and mounting said prism on said microscope in position for receiving said beam of light and maintaining the optical axis of said system substantially coincident with the axis of said beam of light and arranged for transmitting an image of said profile portion being viewed in conjunction with said lens system to said eyepiece, an axis-finding sensor having a straight edge selectively positionable in position adjacent said profile portions being gauged and in a plane parallel to the given axis of said object, means mounting said sensor for rotation about said microscope principal axis in conjunction with said light source, and said means for holding said object being disposed for holding said object between said light source and said prism of said lens system, whereby the axis of said beam of light is positionable tangentially to the profile of a given profile portion of said object to be viewed and gauged regardless of the inclination and pitch of said profile portion relative to said given axis of said object.

2. Apparatus for gauging profiles of objects having a given axis and profile portions inclined and pitched relative to said given axis, means for holding said object in position with said axis extending in a given direction, a microscope having in operation a principal longitudinal axis displaced vertically and horizontally relative to the given axis of said object, said microscope comprising an eyepiece for viewing and gauging the profile of a given one of said profile portions being observed therethrough, means including a lens system in said microscope transmitting an image of the profile of said object being viewed in said eyepiece and mounted rotatable about said microscope principal axis from a given reference position, said lens system having an optical axis parallel to said microscope principal axis, a source of a beam of light, means mounting said source of light spaced from said microscope jointly rotatable with said lens system about said microscope principal axis in fixed relative position with said lens system and mounting said light source for constantly transmitting said beam of light into said lens system, a light deviating prism, means mounting said light deviating prism for rotation about said microscope principal axis relative to said given reference position and unrestricted by said lens system and mounting said prism on said microscope in position for receiving said beam of light and maintaining the optical axis of said system substantially coincident with the axis of said beam of light and arranged for transmitting an image of said profile portion being viewed in conjunction with said lens system to said eyepiece, an axis-finding sensor having a straight edge selectively positionable in position adjacent said profile portions being gauged and in a plane parallel to the given axis of said object, said means mounting said source of light comprising an arm extending away from said microscope principal axis, means comprising a rod pivotally mounted on said arm mounting said sensor for rotation about said microscope principal axis in conjunction with said light source and operable selectively to an operative position in which said sensor straight edge is positioned adjacent to said profile portions and selectively operable to a retracted position, and said means for holding said object being disposed for holding said object between said light source and said prism of said lens system, whereby the axis of said beam of light is positionable tangentially to the profile of a given profile portion of said object to be viewed and gauged regardless of the inclination and pitch of said profile portion relative to said given axis of said object.

References Cited by the Examiner
UNITED STATES PATENTS

| | | | |
|---|---|---|---|
| 1,761,260 | 6/1930 | Gallasch | 88—14 |
| 1,896,828 | 2/1933 | Nichterlein | 88—14 |
| 1,960,554 | 5/1934 | Siedentopf | 88—40 |
| 2,096,325 | 10/1937 | Heine | 88—40 X |
| 3,062,099 | 11/1962 | French | 88—39 X |
| 3,099,185 | 7/1963 | Meltzer | 88—14 X |

DAVID H. RUBIN, *Primary Examiner.*